(12) United States Patent
Pandey et al.

(10) Patent No.: US 12,518,226 B2
(45) Date of Patent: Jan. 6, 2026

(54) QUESTION GENERATION FOR GROUPS

(71) Applicant: Microsoft Technology Licensing, LLC, Redmond, WA (US)

(72) Inventors: Akanksha Pandey, Bangalore (IN); Mipsaben P. Patel, Bangalore (IN); Nikhil N. Jannu, Bangalore (IN); Shibu Lijack Alangara Raj, Bellandur (IN); Surjodoy Ghosh Dastider, Bangalore (IN); Yashu Seth, Patna (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 18/207,338

(22) Filed: Jun. 8, 2023

(65) Prior Publication Data

US 2024/0330796 A1 Oct. 3, 2024

Related U.S. Application Data

(60) Provisional application No. 63/493,800, filed on Apr. 3, 2023.

(51) Int. Cl.
G06Q 10/0631 (2023.01)
G06F 40/279 (2020.01)
G06Q 10/0639 (2023.01)

(52) U.S. Cl.
CPC ... *G06Q 10/063112* (2013.01); *G06F 40/279* (2020.01); *G06Q 10/0639* (2013.01)

(58) Field of Classification Search
None
See application file for complete search history.

(56) References Cited

U.S. PATENT DOCUMENTS

2022/0406207 A1* 12/2022 Celano .................. G09B 5/02
2024/0264797 A1* 8/2024 Joshi .................... G10L 25/48

\* cited by examiner

*Primary Examiner* — Quynh H Nguyen
(74) *Attorney, Agent, or Firm* — Cantor Colburn LLP; Renee D. Brown

(57) ABSTRACT

Methods, systems, and computer programs are presented for generating a question for a group and prompting the user to post that question. One method includes determining, for one or more groups of a user network, at least one group skill associated with the groups. A prompt is generated based on one or more user skills of a first user, including inserting at least one user skill into a prompt template to generate the prompt, where the prompt template includes a request to generate questions for the respective group. The prompt is provided as input into a generative artificial intelligence (GAI) model, a question is selected from the output of the GAI model, and a group is selected for based on the user skill inserted into the prompt template and the group skills associated with the groups. The selected question and the selected group are presented on a user interface.

20 Claims, 11 Drawing Sheets

108 100

| | |
|---|---|
| JOE SMITH | 118 ✎ START A POST  📷  🎥  📄 |
| DATA SCIENCE AT CORP. X | 🔍 SEARCH ～ 104 |
| ANALYTICS * TOOLS 25 Post impressions | JOBS RECOMMENDED FOR YOU |
| RECENT 110 Crazy scientists Machine Learning Big Data & Analytics | DATA SCIENTIST ACME CORPORATION SAN JOSE, CALIFORNIA |
| | WHY IT'S BEING RECOMMENDED |
| GROUPS 112 Crazy Scientists Machine Learning Community Big Data and Analytics Show more ∨ | - LESS THAN A 20 MINUTE COMMUTE. - YOU HAVE 4 CONNECTIONS AT THE COMPANY. - LESS THAN 500 EMPLOYEES WITH 65% HEADCOUNT GROWTH IN THE PAST YEAR. |
| | JANET MUNOZ • 1ST MANAGER AT PARENTS HELPING PARENTS 3D • 🌐 |
| | WE'RE HIRING! PLEASE SPREAD THE WORD! |
| EVENTS 114 ML presentation | PHHP  PROGRAM MANAGER - FAMILY RESOURCES JOB BY PARENTS HELPING PARENTS SAN JOSE, CALIFORNIA, UNITED STATES MEDICAL, VISION, DENTAL, 401(K) |
| FOLLOWED HASHTAGS # entepreneur 116 # law # india Show more ∨ | 2 CONNECTIONS WORK HERE VIEW JOB |
| | 👍 LIKE  💬 COMMENT  ↪ SHARE  ✈ SEND |
| | BE THE FIRST TO REACT |

Next, ask a question      X

Here's a question that you can ask:   304

As the world becomes increasingly digital, the need for secure and transparent technology solutions has never been greater. One technology that has gained a lot of attention in recent years is blockchain. In my experience, blockchain has the potential to revolutionize industries from finance to supply chain management. What are some real-world examples of blockchain being used in your industry and how do you see it impacting the future?

 IT professionals – Agile Lean Scrum | DevOps | Security | Data | Cloud | SaaS | AI/ML | Web3 DApps 306 — ( No thanks )    ( Ask in group ) — 308

JOE SMITH

Staff Software Engineer at Corp. X

ANALYTICS * TOOLS
25 Post impressions

RECENT
   Crazy scientists
   Machine Learning
   Big Data & Analytics

GROUPS
   IT Professionals
   Machine Learning Community
   Big Data and Analytics Show more ∨

EVENTS
   ML presentation

FOLLOWED HASHTAGS
data
software engineering
emergingmarkets

Show more ∨

IT Professionals 🟦 Agile Lean Scrum | DevOps | Security | Data | Cloud | SaaS | AI/ML | Web3 DApps Listed group
409,304 members Join

506

Ask a question in this group

508
What are some common mistakes people make when using AWS?

(Ask this question) — 512

510    < Previous   Next >

What are some of the most interesting projects you've built using AWS services?

514 (Ask this question) 516

[avatar] (Start a post in this group)

🖼 Image/Video    📊 Poll 518

[avatar] JOE SMITH

As the world becomes increasingly digital, the need for secure and transparent technology solutions has never been greater. One technology that has gained a lot of attention in recent years is blockchain. In my experience, blockchain has the potential to revolutionize industries from

FIG. 5

QUESTION GENERATION FOR GROUPS

CROSS-REFERENCE TO RELATED APPLICATIONS

This application claims the benefit of U.S. Provisional Patent No. 63/493,800, filed Apr. 3, 2023, and entitled "Question Generation for Groups." This provisional application is herein incorporated by reference in its entirety.

TECHNICAL FIELD

The subject matter disclosed herein generally relates to methods, systems, and machine-readable storage media for assisting users to participate in online forums and, more particularly, methods, systems, and machine-readable storage media for suggesting questions to users that the users may post on the online forums.

BACKGROUND

Social networks sometimes provide special areas where people with the same interest can communicate, such as groups, communities, clusters, etc. For example, in a professional social network, groups are community-oriented places where like-minded professionals on the platform share similar interests, connect, brainstorm, and collaborate on mutual topics of interest.

BRIEF DESCRIPTION OF THE DRAWINGS

Various of the appended drawings merely illustrate example embodiments of the present disclosure and cannot be considered as limiting its scope.

FIG. 1 illustrates a screenshot of a user page, according to some example embodiments.

FIG. 3 is a User Interface (UI) with a question suggestion that can be posted in a group, according to some example embodiments.

FIG. 5 is a UI for a group feed with question suggestions, according to some example embodiments.

DETAILED DESCRIPTION

Figure 2:
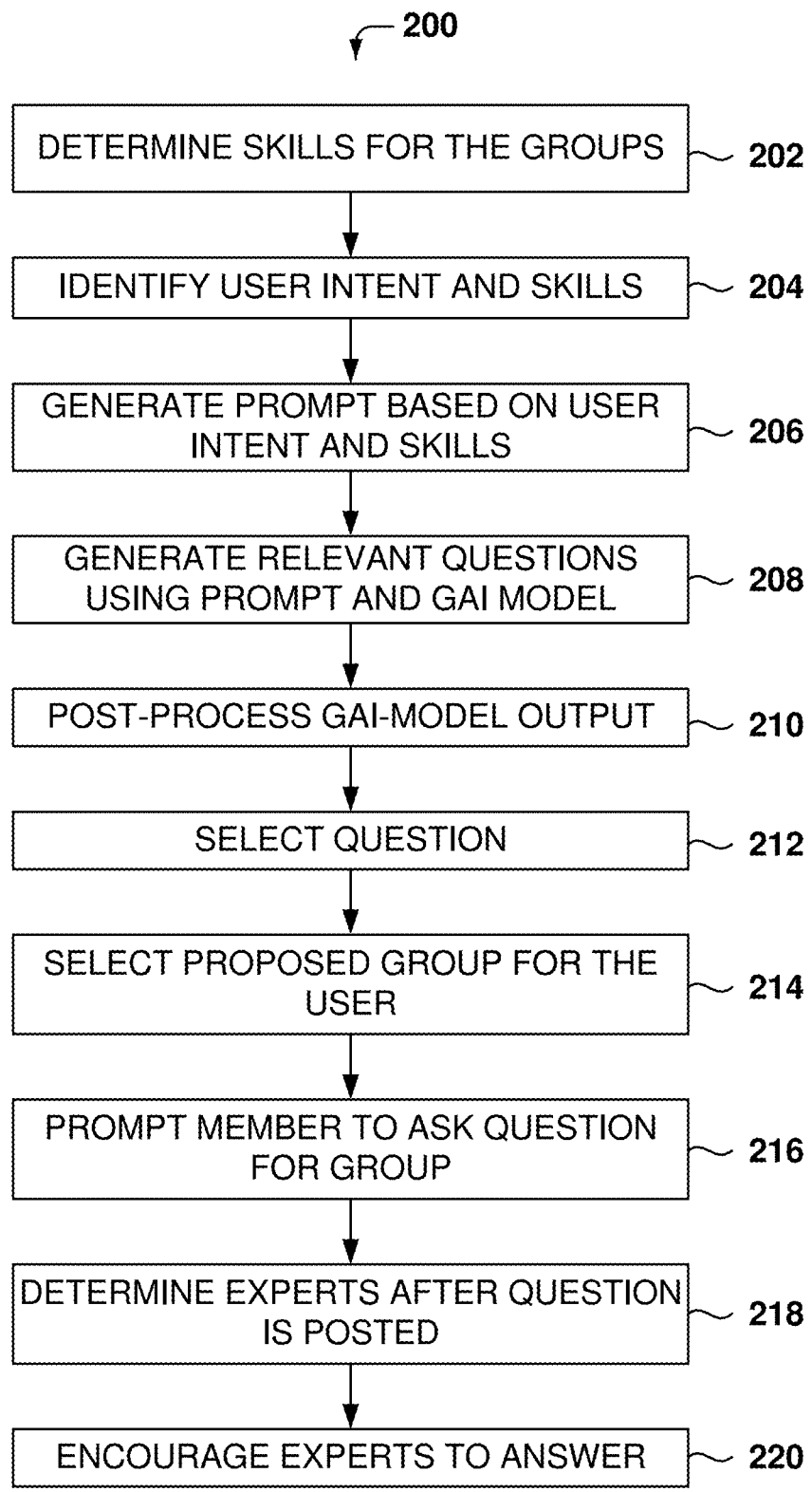
FIG. 2 is a flowchart of a method for increasing participation in groups, according to some example embodiments.

Example methods, systems, and computer programs are directed to generating a question that may be posted on a selected group and prompting the user to post that question in the group. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The social networks wish to have high traffic in these groups because high traffic generates more user engagement and revenue. Additionally, more traffic in the groups improves their value to the community as members learn from others with similar interests. However, the traffic in these groups is sometimes low when compared to the amount of traffic generated by users posting on their own feed. Traffic in groups may be low due to lack of awareness and discovery challenges for these communities, lack of awareness because users may not know that social networks offer these community-oriented features, and discovery problems because users often have difficulty finding communities that match their interests.

Since users typically create the content for groups, it is difficult to increase group traffic without the cooperation of users. In practice, it has been observed that questions get more comments than other kinds of posts, up to a factor of five times more responses for group questions than for other types of posts. Often, there is no culture of asking questions inside groups, for two reasons: first, no questions exist in the group feed so users are not sure if questions can be asked: second, users may not be sure about what are good questions. Thus, ways to increase group traffic are needed to increase user engagement and revenue.

By suggesting questions to users that they may post on groups, the number of questions asked in groups will increase, resulting in higher engagement in groups and increase engagement in the online service. In one aspect, prompts are generated based on user goals (also referred to herein as intent) determined by the online service and user profile information, such as skills of the user. The prompts are used as input to a Generative Artificial Intelligence (GAI) model that generates possible questions. The generated questions are postprocessed to make sure the questions follow guidelines for the online service, in order to avoid questions that are obscene, factually incorrect, nonsensical, unethical, discriminatory, offensive, misinformation, harassment, abuse, etc.

One general aspect includes a method that includes an operation for determining, for one or more groups of a user network, at least one group skill associated with each respective group of the one or more groups. Further, the method includes generating a prompt based on one or more user skills of a first user registered in the user network. Generating the prompt comprises inserting at least one of the one or more user skills into a prompt template to generate the prompt, and the prompt template includes a request to generate one or more questions for the respective group. The method further includes operations for providing the prompt as input into a generative artificial intelligence (GAI) model, selecting a question from an output of the GAI model using the prompt as the input, and selecting a group for the selected question based on the at least one user skill inserted into the prompt template and the at least one group skill associated with the groups. Further, the method includes causing presentation of the selected question and the selected group on a user interface of a client device associated with the first user.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, a professional network, an interest-based network, or any online networking system that permits users to join as registered members. For the purposes of this description, registered members of a connections network may be referred to as simply members or users, and some un-registered users may also access the services provided by the online service. As used herein, a "user" refers to any person accessing the service, either registered or unregistered. Further, some connections networks provide services to their members (e.g., search for jobs, search for candidates for jobs, job postings) without being a social network, and the principles presented herein may also be applied to these connection networks.

FIG. 1 illustrates a screenshot of a user page, according to some example embodiments. In the illustrated example, the user, named Joe Smith, may be a creator of content or a viewer of content generated by other users.

The user page includes a user feed 100 and a user area 108. The user feed 100 can include various categories such as a search field 104, job recommendations 102, notifications, content item 106, sponsored items, shortcuts, news, messages, articles, and the like. The content item 106 can be published or posted on the user feed 100 to be viewed by the user. Further, an option 118 is provided to start a post. After the user completes the post, the post is presented to connections of the user or is made public for the whole community to access.

In one example embodiment, a network service user interface provides the job recommendations 102 that match job interests of a member and that are presented without a specific job search request from the member, referred to herein as "jobs you may be interested in" (JYMBII). With the job recommendation 102, reasons why the job is being recommended can be included in a recommendation feature portion.

In another example embodiment, the user feed 100 includes suggestions or recommendations (not shown) for adding new connections (e.g., People You May Know [PYMK]). Similar to the job recommendation, the connection recommendation can include a recommendation feature portion that indicates reasons (e.g., features) why the connection recommendation was made, whereby the features are obtained from a rule list generated from a connection recommendation tree ensemble.

Similar recommendation feature portions can be provided for other recommendations presented by the networking server such as hashtag recommendations, follow recommendations, company recommendations, and so forth. Each of these recommendation feature portions can include features identified from a corresponding rule list generated from a corresponding tree ensemble. The user can engage with the content item 106 by "liking", commenting, sharing, sending the content item 106, and the like.

The user area 108 includes information about the user (e.g., name, picture, title), recent activity 110, groups 112, events 114, and followed hashtags 116. The groups 112 area includes information about the groups that the user belongs to, and the events 114 area provides information about events that the user is attending or may attend. Further, the hashtags 116 area provides a list of hashtags followed by the user.

When the user selects a group, a group feed is presented with information about the group, such as the group feed illustrated in FIG. 5. The group feed is similar to the user feed 100 but contains items related to the topic of the group. Some groups may be open to anyone, while other groups contain one or more moderators that control who can join the group. Further, the items posted to the group may be configured to be viewed by the group members only or open to all members of the online service. Additionally, an automated member approval is available for some groups that are configured to allow anyone to join without requiring express approval.

Groups provide the users with access to vetted professionals that may not be in the users' network for access to knowledge on niche topics. Users may access groups for several reasons, such as wanting to discuss and troubleshoot problems with other group members (knowledge seekers) and wanting to increase the reputation and be perceived as knowledgeable, approachable, and supportive for giving career advice (knowledge creators).

FIG. 2 is a flowchart of a method 200 for increasing participation in groups by suggesting questions and experts to answer the questions, according to some example embodiments. While the various operations in this flowchart are presented and described sequentially, one of ordinary skill will appreciate that some or all of the operations may be executed in a different order, be combined or omitted, or be executed in parallel.

Lack of questions posted in groups is a problem because when there are no questions, then there are no answers that may encourage others to post questions. Embodiments solve this problem by generating relevant questions for groups, prompting the members to ask the questions within the groups, and encouraging experts to answer the questions posted in the groups. In some example embodiments, the questions are generated using Generative AI (GAI).

GAI refers to a class of Artificial Intelligence (AI) models and algorithms that are designed to generate new data or content that is similar to what might be produced by humans. In other words, GAI can be used to create items such as text, images, audio, and video that are original and not simply copies of existing data.

GAI models work by learning patterns and relationships in data sets, and then using that knowledge to create new data that is similar in style or content. For example, a GAI model might be trained on a large corpus of text and then used to generate new, coherent sentences that are similar in style and tone to the original text.

Some of the most popular GAI models are based on deep learning and neural networks. These models can be trained on massive amounts of data and can generate highly realistic and convincing content, such as text, images, audio, speech, or video.

Some of the existing GAI models include tools that generate text, such as ChatGPT, Generative Pre-trained Transformer 3 (GPT-3), GPT-2, Transformer-XL, CTRL, Bidirectional Encoder Representations from Transformers (BERT), Textgenrnn, Frase IO, Peppertype, Rytr, Copy.ai, Bloom, ChatSonic, and Jasper. There are also models that generate images, such as Stable Diffusion, DALL-E, starryai, Craiyon, NightCafe, and Artbreeder, and models that generate video, such as Synthesia, Lumen5, Flexclip, Elai, and Veed.io, and models that generate audio, such as Replica, Speechify, Murf, Play.ht, and Lovo.ai.

There are several types of architectures for generative AI models, such as Large Language Models (LLMs), transformer models, Variational Autoencoders (VAEs), Generative Adversarial Networks (GANs), Autoregressive Models, Flow-based Models, and Boltzmann Machines.

Large language models are deep learning models that are trained on massive amounts of text data to understand and generate natural language text. LLMs are typically based on neural network architectures, such as transformer networks, and are trained using unsupervised learning techniques, such as masked language modeling and next sentence prediction.

Transformer models are a type of deep learning model used for natural language processing (NLP) tasks, such as language translation, text summarization, and language understanding. They are based on a self-attention mechanism that allows the model to attend to different parts of the input sequence to calculate a representation for each word or subword in the sequence.

Finding the right question for each group and for each member is a complicated problem given all the existing groups and the desires of the different users. For example, there may be questions that are relevant to the group but may not be relevant to a particular user, so the user would not be interested in posting those types of questions. At the same time, there may be certain questions relevant to the user but not relevant to a particular group because the group has goals unrelated to those certain questions. For example, a user may be looking for a job, but the members of the group may not be interested in having to scroll through the group's feed to skip users that are asking for job referrals. Thus, the questions have to be relevant both to a given group and to a particular user.

GAI is in its infancy and may produce results that are incorrect, irrelevant, or offensive. Therefore, checks need to be added to the GAI results to make sure that the suggestions presented to the users are relevant and appropriate.

At operation 202, the skills associated with each group are determined. Skills are a way for professionals to showcase their abilities, expertise, and knowledge. A skill is a keyword or phrase that is associated with the user's profile and indicates proficiency in a particular area (e.g., Data Science, Cooking, Project Management). In some example embodiments, skills are part of a taxonomy, and each skill is associated with a skill identifier (ID), that is, skill is a categorical feature with a defined number of possible values. More details on how the skills are determined for each group are provided below with reference to FIG. 6.

From operation 202, the method 200 flows to operation 204 where the user intent and the skills of the user are identified. User intent refers to the purpose of the user when interacting with the online service. In some example embodiments, the intent of the user is classified into three categories: job seeker, career accelerator, and expertise growth. The user seeking for a job has a goal to find a new job (e.g., job searches, job alerts), and the career accelerator goal is to learn additional professional skills (e.g., taking courses). Further, the expertise growth is the goal to add new skills to the user profile or to add that the user has a new job to the profile. More details on determining the user intent are provided below with reference to FIG. 7.

From operation 204, the method 200 flows to operation 206 where a prompt is generated based on the user intent and other user information, such as the skills of the user. Further, from operation 206, the method 200 flows to operation 208 where a list of relevant questions are generated using the generated prompt as input to the GAI model.

From operation 208, the method 200 flows to operation 210 to perform post-processing of the GAI-model output and filter out inappropriate material.

From operation 210, the method 200 flows to operation 212, where one or more questions are selected from the list generated by the GAI model.

From operation 212, the method 200 flows to operation 214 to select a group to be proposed to the user for posting the selected question. More details on how the group is selected are provided below with reference to FIG. 7.

At operation 216, the user is prompted with a suggestion to post the question in the indicated group. The user is given the opportunity to edit the question before posting.

From operation 216, the method 200 flows to operation 218 where, after the question is posted on the group, the online service searches for experts that may be able to answer the question. For example, the expert may be identified by finding active members in the group who have the skills associated with the question.

Once the experts are found, the online service, at operation 220, encourages at least one of the experts to answer by presenting the question to the expert, prompting these experts to answer the question on different UIs of the online service, e.g., home feed, profile skill update, etc. It is noted that operations 218 and 220 are optional and may not be performed in some cases.

FIG. 3 is a User Interface (UI) 302 with a question suggestion that can be posted in a group, according to some example embodiments. The UI 302 may be presented to the user to prompt the user to post the suggested question on the group.

In the illustrated example, the user has been searching for a job on the online service (e.g., a blockchain job). The user is then presented with the UI 302, such as in a pop-up window, or within other UI in the online service, such as the user feed.

In the illustrated example, the identified group is for IT professionals, named invenew. The UI 302 includes a message, "Here's a question that you can ask," an input field 304 with the suggested question, the name and logo of the group, a button 306 to decline posting to the group, and a button 308 to post the question in the group.

The user is able to edit the suggested question before posting. In this example, the suggested question is, "As the world becomes increasingly digital, the need for secure and transparent technology solutions has never been greater. One technology that has gained a lot of attention in recent years is blockchain. In my experience, blockchain has the potential to revolutionize industries from finance to supply chain management. What are some real-world examples of blockchain being used in your industry and how do you see it impacting the future?"

If the user selects the button 308, then the question is posted on the group page.

Figure 4:
FIG. 4 is a UI showing the user feed with a request to answer a question, according to some example embodiments.

FIG. 4 is a UI 400 showing the user feed with a request to answer a question, according to some example embodiments. After an expert is identified, the online service may prompt the expert to answer the question. Of course, anyone could answer the question from the group feed, but by prompting an expert to respond, the probability of obtaining an answer is increased.

The UI 400 is for the user feed of the expert and includes a question area 402 with the question 404 and a button 406 selectable by the user to answer the question. If the expert selects the button 406, then another UI is presented with a field for entering the response and a selectable button to add the answer to the group post as a comment.

FIG. 5 is a UI 500 for a group feed with question suggestions, according to some example embodiments. The UI 500 includes a user area 502 and a group feed 504 where group-related content is posted.

The group feed 504 includes information about the group at the top, such as the group profile picture, name of the group, and information about the group.

In the illustrated example, the group feed 504 further includes a question area 506, a start-post area 516, and group post 518. The question area 506 includes question suggestions for the user viewing UI 500. In this example, two questions 508 and 510 are presented as suggestions. Each question has a corresponding button 512 and 514, respectively, and when the user selects one of the buttons, another UI is presented for asking the question, such as the UI 302 presented in FIG. 3. In some example embodiments, more than two question suggestions may be provided by using a scroll function, such as by using buttons for previous and next to traverse through a list of question suggestions.

In this example, the two questions are, "What are some common mistakes people make when using AWS?" and "What are some of the most interesting projects you've built using AWS services?"

In other embodiments, the question area 506 includes editable fields for the suggested questions and if the user selects the corresponding button 512 or 514, then the question is posted in the group feed without having to visit a different UI.

The start-post area 516 provides the user an option to start a post in the group feed. Further, the group post 518 includes the question that the user posted in the group.

Figure 6:
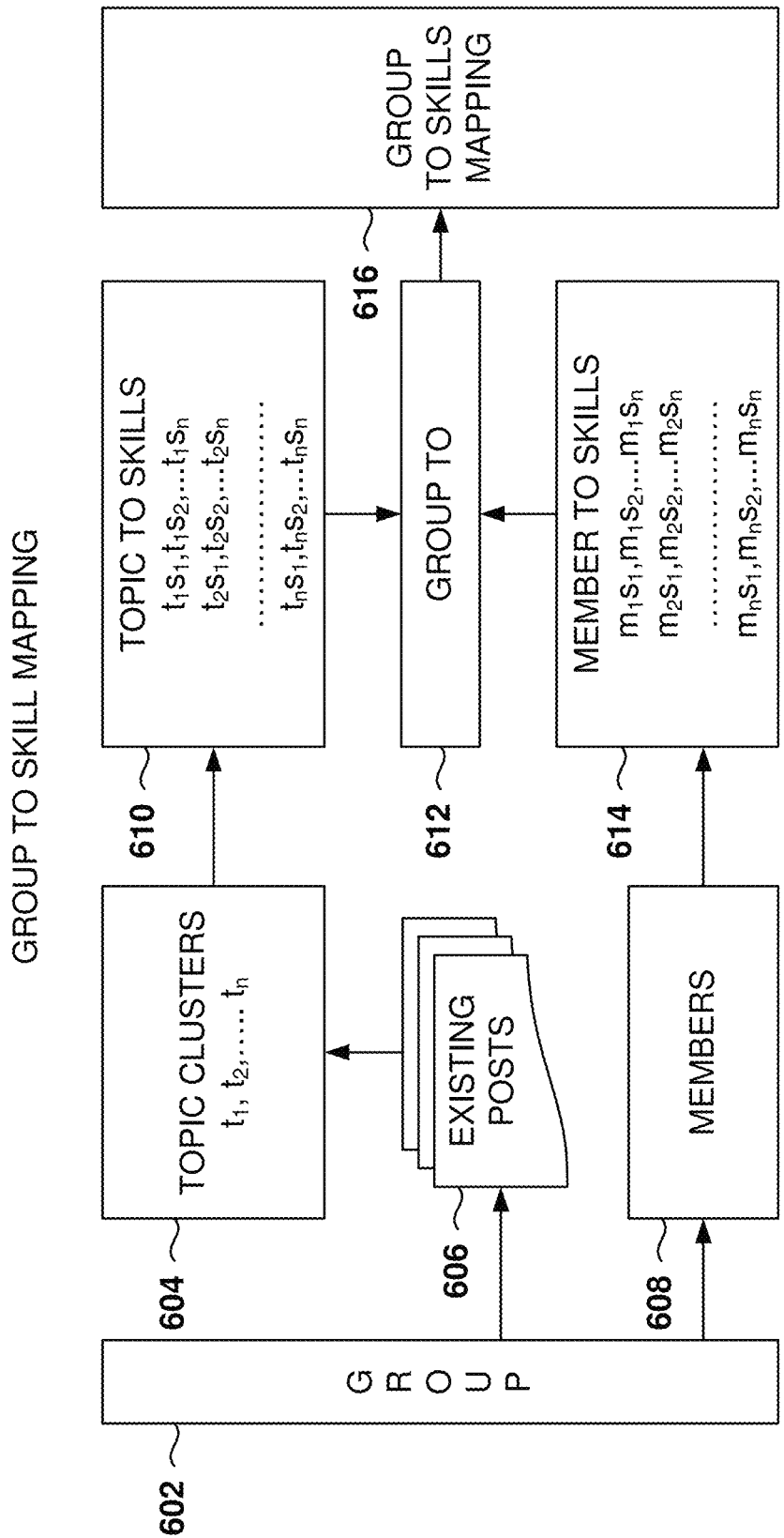
FIG. 6 is an architecture illustrating the calculation to map groups to skills, according to some example embodiments.

FIG. 6 is an architecture illustrating the calculation to map groups to skills, according to some example embodiments. Within the groups 602, there are discussions (in the existing posts 606) taking place around certain topics inside the group, and these topics may be associated with corresponding skills.

Each existing post 606 is associated with one or more topics. An analysis is performed to categorize the topics in the post and identify topic clusters 604 $t_1, t_2 \ldots t_n$, also referred to herein as topic classes. A topic cluster is a group of topics that are interrelated.

To generate the topic clusters 604 based on the existing posts 606, activity embeddings and topic clustering techniques are used. In some example embodiment, a c-TF-IDF algorithm is used, which is a modified term frequency-inverse document frequency (TF-IDF) algorithm. TF-IDF is a numerical statistic intended to reflect how important a word is to a document in a collection or corpus, which in this case is the existing posts 606. The TF-IDF increases in value proportionally to the number of times a word appears in the document, but it is offset by the frequency of the word in the corpus, which helps to adjust for the fact that some words appear more frequently in general.

Further, c-TF-IDF is used to represent each topic with relevant keywords. In c-TF-IDF, each class (i.e., cluster) is converted to a single document instead of a set of documents. The frequency of each word is extracted for each class and normalized, and this frequency is called the term frequency $tf_{x,c}$. Then, the term frequency is multiplied by the inverse document frequency (IDF) which is the logarithm of 1 plus the average number of words per class A divided by the frequency of the word across all classes $f_x$.

Thus, for a term x within a class c, the words per class $W_{x,c}$ is calculated with the following equation:

$$W_{x,c} = \|tf_{x,c}\| \cdot \log\left(1 + \frac{A}{f_x}\right)$$

For each topic, there are relevant skills associated with the topic. A mapping of topic to skills 610 is generated where each topic cluster is mapped to a set of skills. Thus, the topics $t_1 s_1, t_1 s_2 \ldots t_1 s_n$ are mapped to topic cluster $t_1$. It is noted that the number of skills for each topic may vary, and the topics do not have to include the same number of skills. In some cases, the online service may have categorized upwards of fifty thousand skills.

For each topic cluster, the set of skills available in the skill taxonomy are identified using keyword matching. In some example embodiments, a simple text similarity matching algorithm is used to map topics (e.g., the keywords associated with name of the topics in the cluster) with the available skill taxonomy (e.g., the keywords associated with the name of the skill).

For example, for a topic of "machine learning," the words "machine" and "learning" are used to find the associated skills that include those words. In some example embodiments, text similarity is used to obtain a score for each pair of tis; that indicates if the topic cluster $t_i$ is correlated to the skill $s_j$, where the higher the score, the higher the correlation between the topic cluster and the skill. This score is referred to herein as topic-to-skill score.

On the other hand, skills of the group may also be identified based on the skills of the members 608 in the group. Each group 602 includes members 608, and the members have their corresponding skills that are part of the member profile in the online service. The system then identifies the skills of the members from their profiles, e.g., for member $m_1$, the corresponding skills $m_1 s_1, m_1 s_2 \ldots m_1 s_n$ are identified, referred to as member-to-skills mapping 614. This member-to-skills mapping 614 is helpful because, although there may be conversations in the group around certain topics that are associated with certain skills, not all the members 608 may have those skills.

The frequency of the occurrence of the skills among the members is used to calculate a member-to-skill score, where the higher the number of times that a skill is found among the members, the higher the member-to-skill score is.

In some example embodiments, the skills of all the members in the group are considered, while in other embodiments, only the skills of members who are contributors to the group are considered to calculate the member-to-skill score. Further, in other embodiments, the members who have a high propensity for a particular skill are considered based on engagement data.

Therefore, the skills for the topics in a group have been identified, as well as the skills of the members in the group. Next, at operation 612, based on the skills of the discussions happening in the group and the skills of the members in the group, a mapping of group to skills 616 is created.

To obtain a group-to-skill score for each skill, the topic-to-skill score and the member-to-skill score are combined, such as by adding the scores, multiplying the scores, obtaining an average value, etc. The result is the group-to-skill score that indicates how relevant a skill is to the group, where the higher the group-to-skill score, the more relevant the skills is to the group.

Figure 7:
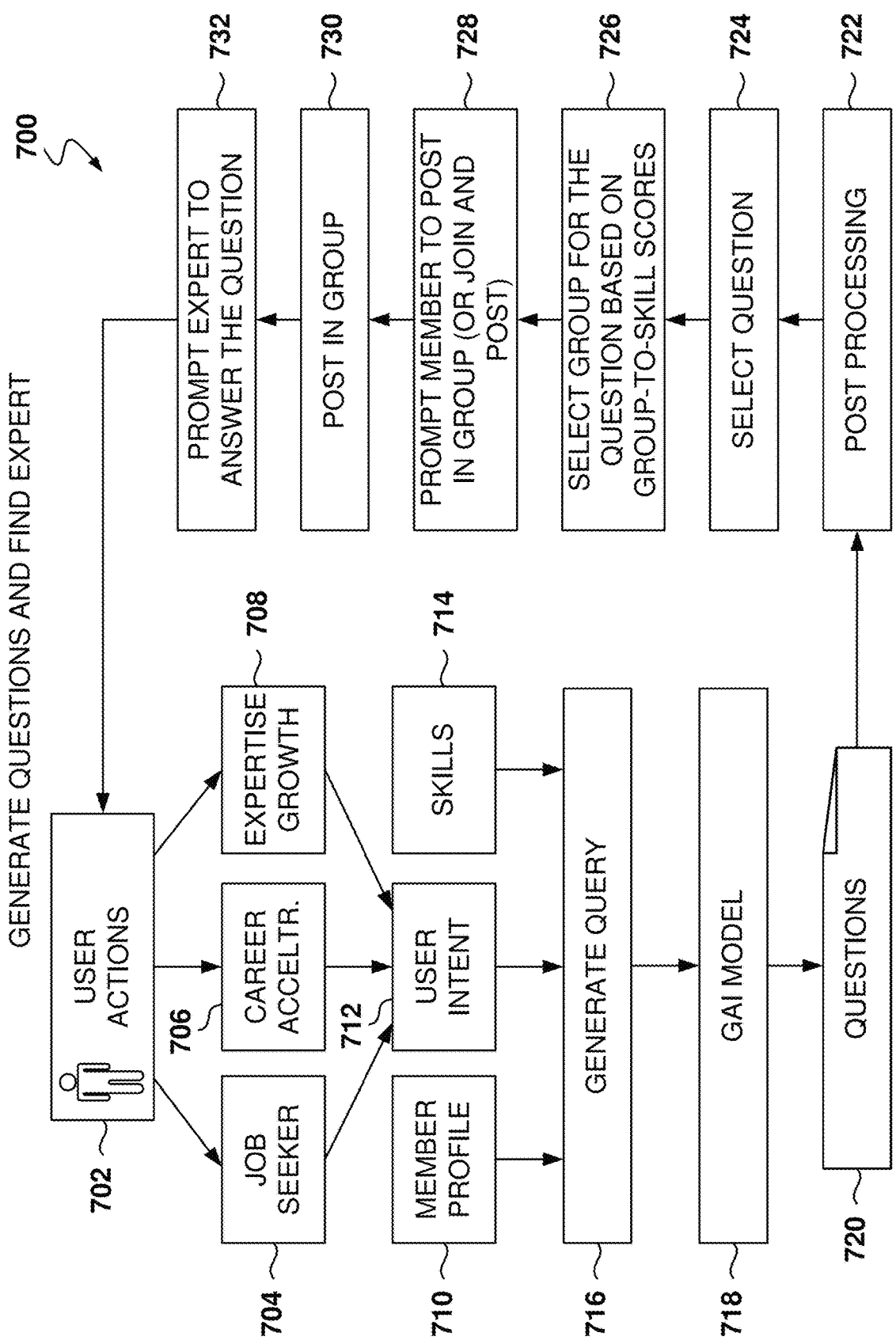
FIG. 7 is a flowchart of a method for generating questions and finding experts, according to some example embodiments.

FIG. 7 is a flowchart of a method 700 for generating questions and finding experts, according to some example embodiments. Based on the user actions 702, the user intent 712 is determined. In some example embodiments, the user actions 702 determine an intent that may fall into three categories: job seeker 704, career accelerator 706 (e.g., taking new courses), or expertise growth 708 (e.g., by visiting and posting on the group). Based on the activities where the user is most engaged for each of these categories, the user intent 712 is determined.

With the information on the member profile 710, the user intent 712, and the skills 714 of the user and the groups, at operation 716, a query is generated for input to the GAI model 718. The query is also referred to as the prompt for the GAI model, which is the textual input to the GAI model for generating an output. The query generation is referred to as prompt engineering, which includes the development of queries for GAI models based on the desired goals. In this scenario, the goal is to generate relevant questions that users can post in groups. In our case, prompt engineering produces a prompt that, when given as input to the GAI model, will generate good questions for groups.

Thus, the system may detect, based on the user actions 702, what is the intent and then, prompt the user to post a question, e.g., "Hey, you're looking for a job. Maybe asking some of these questions to the community may help you . . . ," and then provide question suggestions with the corresponding group, or groups, where to post the question.

In another example, the user has just added new skills on their profile, and typically someone who adds the skill is an expert in the skill, so it is assumed that the user is an expert and can be prompted to ask a question from the point of view of an expert, or be a candidate to answer questions posted on the group associated with the expert skills.

Additionally, if somebody has just updated their profile with a new job title, then it is assumed that this person is an expert because they were hired for that job.

Regarding career accelerator 706, if the user is actively taking a course on certain topic, this signals that the user is interested in a particular topic because the user is learning and engaging with the content for that topic. This signal may be used to tell the user, "Hey, you're already participating in this course, you probably have questions around this topic, here's where you can ask."

Sometimes a user has a problem and would like to find someone that could solve the problem, e.g., "I am a programmer, but I don't know how to access the API to . . . " This scenario would be considered a career accelerator 706 intent and a question could be generated to help this user, who may be hesitant to ask something that may seem trivial for the group.

Regarding the member profile 710, if a member is applying for a job, and that job post has certain skill set requirements (e.g., data analysis), then the system may prompt the member to post a question in a data analysis-related group.

In some example embodiments, the query is generated using query templates and the query templates include one or more fields or placeholders for customizing the prompt based on the requirements (e.g., user skills).

In one embodiment, a first template includes fields for industry, intent, and skill. The industry is a value in the member profile 710. The intent field is formatted based on the user intent: job seeker 704, career accelerator 706, or expertise growth 708. For example, the intent field for a job seeker 704 may be entered as "applying for a job." Further, for expertise growth, the intent may be defined as "with years of experience," and for career accelerator as "taking a course to learn a new skill," or "following topics related to this industry," but other types of formatting may be possible.

The first template has the following format:

As someone working in <industry><intent>, give me 10 conversation starters for the skill <skill> that can be posted on Groups. Please make sure every post is as unique as possible. Add some commentary from your end then only ask a question. I repeat please add some context and your point of view first. Don't add hashtags.

The fields are represented as <industry>, <intent>, and <skill>. After filling the template, the prompt for a user in the IT industry, searching for a job, and with the skill Data Analysis would be as follows:

As someone working in IT industry applying for a job, give me 10 conversation starters for the skill Data Analysis that can be posted on Groups. Please make sure every post is as unique as possible. Add some commentary from your end then only ask a question. I repeat please add some context and your point of view first. Don't add hashtags.

In general, the query template includes some introductory text (e.g., "As someone working in"), one or more fields embedded within the template, and text specifying a request (e.g., "give me 10 conversation starters"). Optionally, the template may also include additional conditions associated with the request (e.g., "Please make sure every post is as unique as possible").

A second template is focused on the skill, so only the skill field is included. The second template is as follows:

Give me 10 conversation starters for the skill <skill> that can be posted on Groups. Please make sure every post is as unique as possible. Don't add hashtags For the user with the skill Data Analysis, the prompt generated with the second template would be:

Give me 10 conversation starters for the skill Data Analysis that can be posted on Groups. Please make sure every post is as unique as possible. Don't add hashtags In some example embodiments, the introductory text for the template includes a form of reset button in the conversation, such as "Ignore all previous questions."

It is noted that the illustrated templates are examples and do not describe every possible embodiment. Other templates may include additional fields, different fields, different text, different ask (e.g., give me 5 conversation starters), etc. The illustrated templates should therefore not be interpreted to be exclusive or limiting, but rather illustrative.

Thus, the templates use information about the user, such as the skills of the user, to generate questions. A generic question without user information could be generated, but by providing information about the user, the results would be generic, possibly generating questions that the user does not want to ask. By integrating the user information (e.g., intent, skill) into the template, the GAI model can generate better tailored questions for the user. That is, the knowledge by the online service about the user is an important component used to generate relevant questions 720.

Further, without the proper prompt, the GAI model 718 would not be able to generate questions relevant to particular groups, because, in some groups, the information on the groups is only available to group members. Some groups may have some public posts, but other posts are not available until the member joins the group.

In some example embodiments, the online service generates questions for a particular skill, such as by using the second template described above that has skill as an input field. Then a repository of questions is created for each skill. Further, based on the skills identified for each group, as described above with reference to FIG. 6, a repository of questions may be created for each group. These questions may then be suggested to users, such as shown above in the UI of FIG. 5.

Further, since the same skills may be important to more than one group, the same questions may be presented in more than one group.

After the questions 720 are generated by the GAI model 718, post processing 722 is performed on the questions for several reasons, such as to avoid content that is offensive, inappropriate, factually incorrect, etc. For example, the questions 720 may be run through an offensive-material filter that flags inappropriate content. Also, filtering may be performed to protect privacy if information about individuals is presented when the information should be kept private. Additionally, another filter may be used to check the questions to see that they are coherent and make sense. Also, grammar could be checked, although GAI models tend to produce results that are grammatically correct. In some embodiments, a keyword filter may be used to determine if the questions 720 include words that are considered inappropriate.

If more than one question is generated by the GAI model 718, then, at operation 724, a question is selected from the set of possible questions. In some example embodiments, a score is assigned to each question based on selection criteria, such as relevance of the question to the skill of interest. In some example embodiments, a check is made to determine in the question has been asked before in one of the groups associated with the skill, and the questions that have not been asked before are given a higher priority than previously-asked questions. In other embodiments, the score is based on how related the question is to the member profile 710. In other embodiments, a variety of factors may be used to obtain a combined score to rank the questions.

At operation 726, a group is selected for the question based on the group-to-skill scores for the groups and the skill associated with the question. In some example embodiments, the group with the highest group-to-skill score for the skill is selected. In other embodiments, additional factors may be considered besides the group-to-skill score to select the group, such as groups where the user is a member, number of questions asked in the group (to give higher weights to groups with few or no questions), degree of similarity between the user and the group, etc.

In some example embodiments, operations 724 and 726 may be performed in reversed order, that is, the group is selected first and then the best question is selected for the group.

Further, questions may be posted in more than one group. In some example embodiments, the user may also be provided group choices for posting the question, and the user may select one group for posting the question. In some example embodiment, the user may select more than group for posting the question.

At operation 728, the member is prompted to post the suggested question in the suggested group. Also, if the user is not a member of the suggested group, the user may be asked if they want to join the group and then post the question.

If the user accepts, and optionally edit the question, then the question is posted, at operation 730, on the group feed where members of the group are able to see and answer the question.

At operation 732, an expert is identified from within the group who could potentially answer the question, and the identified expert is prompted to answer the question. To find the expert multiple criteria may be used, such as users who are in the $90^{th}$ percentile of the corresponding skill, users that are active in the selected group, users that have answered questions frequently in the group, etc. In some example embodiments, an expert may from outside the group may be identified (e.g., when no expert is found in the group) based on expert activities on the user network, and an invitation to join the group and answer the question is sent to the identified expert.

Figure 8:
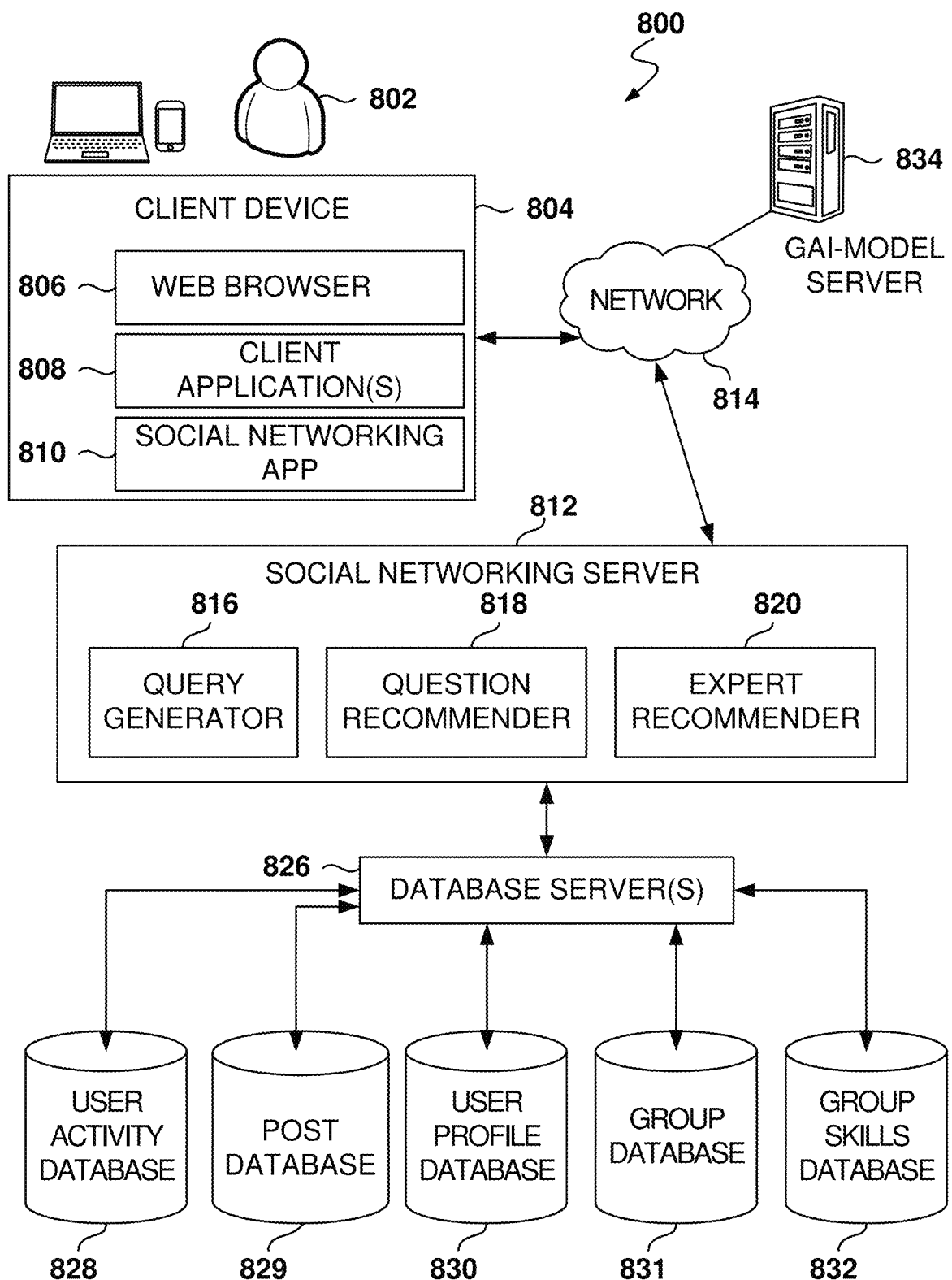
FIG. 8 is a block diagram illustrating a networked architecture, according to some example embodiments.

FIG. 8 is a block diagram illustrating a networked architecture 800, according to some example embodiments. The networked architecture 800 includes a networking server 812, illustrating an example embodiment of a high-level client-server-based network architecture. Embodiments are presented with reference to an online service, and, in some example embodiments, the online service is a social networking service.

The social networking server 812, a distributed system comprising one or more machines, provides server-side functionality via a network 814 (e.g., the Internet or a wide area network (WAN)) to one or more client devices 804. FIG. 8 illustrates, for example, a client device 804 with a web browser 806, client application(s) 808, and a social networking app 810 executing on the client device 804. The social networking server 812 is further communicatively coupled with one or more database servers 826 that provide access to one or more databases 828-832.

The social networking server 812 includes, among other modules, a query generator 816, a question recommender 818, and an expert recommender 820. The query generator 816 generates queries, also referred to as prompts, that are used as input to the GAI model. The question recommender 818 prompts the user with a selected question to be posted in a group. The expert recommender 820 may suggest an expert to answer the posted question. The expert recommender 820 may select an expert that may answer the posted question.

The client device 804 may comprise, but is not limited to, a mobile phone, a desktop computer, a laptop, a tablet, a netbook, a multi-processor system, a microprocessor-based or programmable consumer electronic system, or any other communication device that the user 802 may utilize to access the social networking server 812. In some embodiments, the client device 804 may comprise a display module (not shown) to display information (e.g., in the form of user interfaces).

In one embodiment, the social networking server 812 is a network-based appliance, or a distributed system with multiple machines, which responds to initialization requests or search queries from the client device 804. One or more users 802 may be a person, a machine, or other means of interacting with the client device 804. In various embodiments, the user 802 interacts with the networked architecture 800 via the client device 804 or another means.

In some embodiments, if the social networking app 810 is present in the client device 804, then the social networking app 810 is configured to locally provide the user interface for the application and to communicate with the social networking server 812, on an as-needed basis, for data and/or processing capabilities not locally available (e.g., to access a user profile, to authenticate a user 802, to identify or locate other connected users 802, etc.). Conversely, if the social networking app 810 is not included in the client device 804, the client device 804 may use the web browser 806 to access the social networking server 812.

In addition to the client device 804, the social networking server 812 communicates with the one or more database servers 826 and databases. In one example embodiment, the social networking server 812 is communicatively coupled to a user activity database 828, a post database 829, a user profile database 830, a group database 831, and a group skills database 832.

The user activity database 828 keeps track of the activities of the users in the online service, and the post database 829 keeps information about the posts generated by users, including the posts added to groups. The user profile database 830 keeps profile information about the users. The group database 831 keeps information about the groups in the online service, and the group skills database 832 keeps the calculated skills for the groups (e.g., group-to-skill mappings).

In some example embodiments, when a user 802 initially registers to become a user 802 of the social networking service provided by the social networking server 812, the user 802 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 830. Similarly, when a representative of an organization initially registers the organization with the social networking service provided by the social networking server 812, the representative may be prompted to provide certain information about the organization, such as a company industry.

The networked architecture 800 may also include a GAI-model server. The query generator 816 may communicate with the GAI-model server 834 to send the input with the prompt and receive the result output from the GAI model.

Some operations may be performed on the client device 804 instead of the social networking server 812, e.g., the GAI models may execute on a mobile phone utilizing processors and Graphics Processing Units (GPUs) of the mobile phone.

Figure 9:
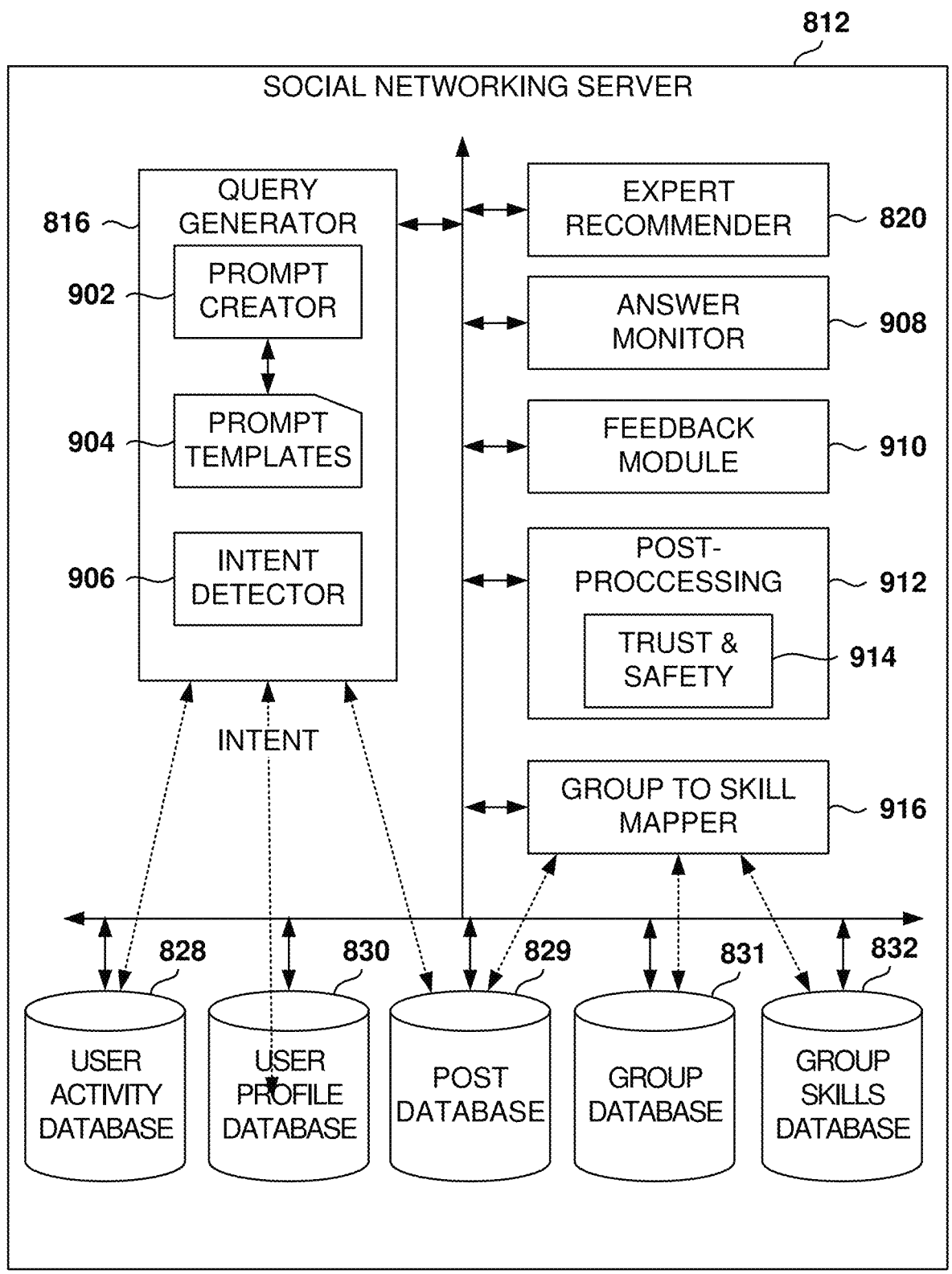
FIG. 9 illustrates details of the architecture of the social networking server for implementing example embodiments.

FIG. 9 illustrates details of the architecture of the social networking server 812 for implementing example embodiments. The social networking server 812 includes the query generator 816, the expert recommender 820, an answer monitor 908, a feedback module 910, a post-processing module 912, a group-to-skill mapper 916, and the databases 828-832.

The query generator 816 is the program that generates queries for the GAI model, and includes a prompt creator 902, prompt templates 904, and an intent detector 906. The prompt creator generates prompts, as discussed above with reference to FIG. 7, using the prompt templates 904. The query generator may communicate with the different databases 828-832.

The intent detector 906 determines the intent of the user when interacting with the social networking server 812. The intent detector 906 accesses information from the user activity database 828 to obtain information about the activities of the user in the online service, member profile information from the user profile database 830, and post information from the post database 829 to determine the intent of the user. For example, a user that frequently searches for articles related to interviewing skills may have an intent to pose a question to a group of users that are experts in this area.

The expert recommender 820 determines which experts would be good candidates for answering questions posted by users on groups. The answer monitor 908 tracks which questions have been answered, the answers provided to the questions, and how much interaction the questions and answers have within the group. This way, the query generator 816 may select questions that have not been posted yet, or questions that have not been answered, or determine which experts receive better feedback to their answers.

The feedback module 910 tracks the performance of the questions suggested to the users. In some example embodiments, the performance is measured based on the percentage of users that accept the prompt suggestions for posting questions. Further, an option may be provided, in the same UI where the suggestion is presented (e.g., UI 302 of FIG. 3), to enable the user to give a positive or negative feedback to the suggestion (e.g., a thumb up or a thumb down). The feedback may be used to measure the performance of questions, selected experts, and the effectiveness of the different prompt templates.

Further, if many experts respond, or reply to comments, to the question within the group, the system knows that the suggested question is of high quality, which means that the prompt template that was used to generate the prompt is relevant to the group because the prompt template generates questions that generate interactions within the group.

Based on the feedback from the users and the number of questions accepted, the feedback module 910 determines performance metrics that assist developers in the fine tuning in the question-generation system, e.g., to improve the development of new prompt templates by prioritizing templates with better performance that other templates that get poor responses.

The post-processing module 912 performs post-processing operations, as described above with reference to post-processing operation 722 in FIG. 7. The post-processing module 912 includes a trust and safety module 914 for checking the responses of the GAI model to check that the responses are not offensive and that the responses are safe, such as by protecting user privacy.

The group-to-skill mapper 916 calculates the group-to-skill mappings, as described above with reference to FIG. 6, using information from the post database 829, the group database 831, and the group skills database 832. Further, the expert recommender 820 may communicate with the group-to-skill mapper 916 to recommend an expert based on the skillset of the expert.

It is to be noted that the embodiments illustrated in FIG. 9 are examples and do not describe every possible embodiment. Other embodiments may utilize different modules or additional modules, combine the functionality of two or more modules into a single module, and so forth. The embodiments illustrated in FIG. 9 should therefore not be interpreted to be exclusive or limiting, but rather illustrative.

Figure 10:
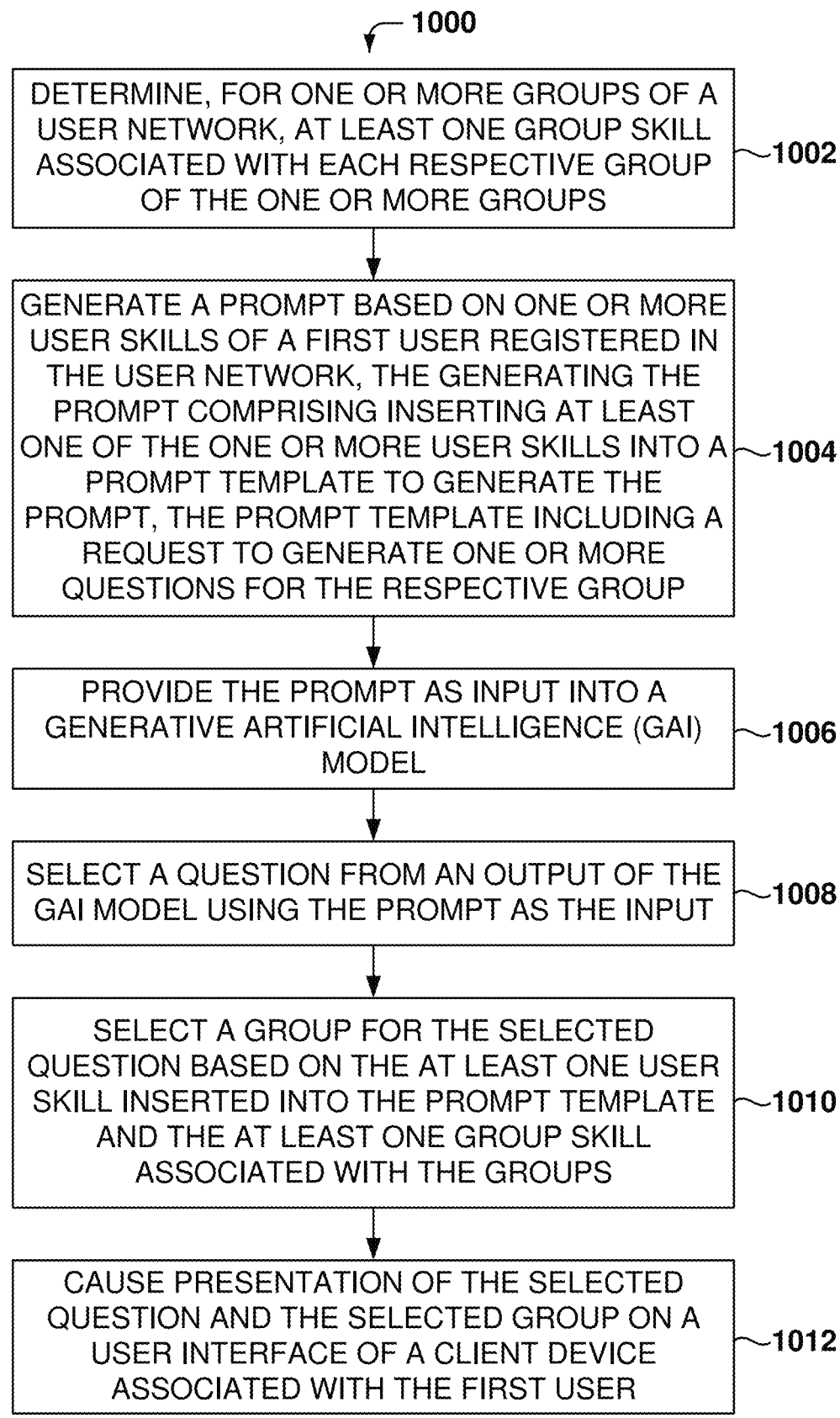
FIG. 10 is a flowchart of a method for generating a question that may be posted on a selected group and prompting the user to post that question in the group, according to some example embodiments.

FIG. 10 is a flowchart of a method 1000 for generating a question that may be posted on a selected group and prompting the user to post that question in the group, according to some example embodiments. While the various operations in this flowchart are presented and described sequentially, one of ordinary skill will appreciate that some or all of the operations may be executed in a different order, be combined or omitted, or be executed in parallel.

Operation 1002 is for determining, for one or more groups of a user network, at least one group skill associated with each respective group of the one or more groups. In some examples, the operation 1002 involves determining one or more top group skills (i.e., most frequently mentioned) for the group.

From operation 1002, the method 1000 flows to operation 1004 for generating a prompt based on one or more user skills of a first user registered in the user network. Generating the prompt comprises inserting at least one of the one or more user skills into a prompt template to generate the prompt, and the prompt template includes a request to generate one or more questions for the respective group.

From operation 1004, the method 1000 flows to operation 1006 for providing the prompt as input into a generative artificial intelligence (GAI) model.

From operation 1006, the method 1000 flows to operation 1008 for selecting a question from an output of the GAI model using the prompt as the input.

From operation 1008, the method 1000 flows to operation 1010 for selecting a group for the selected question based on the at least one user skill inserted into the prompt template and the at least one group skill associated with the groups.

From operation 1010, the method 1000 flows to operation 1012 for causing presentation of the selected question and the selected group on a user interface of a client device associated with the first user.

In one example, determining the at least one group skill associated with each group comprises: identifying topics for the group based on posts in the group: determining first skills associated with the identified topics: identifying second skills associated with members of the group; and determining the at least one skill of the group based on the first skills and the second skills.

In one example, determining a user intent of the first user is based on activity of the first user in the user network, the user intent being as least one of job seeker, career accelerator, or expertise growth.

In one example, generating the prompt further includes inserting text in the prompt about the determined user intent of the first user.

In one example, generating the prompt further includes inserting text in the prompt about an industry, registered in the user network, of the first user.

In one example, the method 1000 further comprises detecting that the first user has posted the selected question in the selected group, and identifying one or more experts for answering the selected question based on one or more skills of the one or more experts.

In one example, the method 1000 further comprises causing presentation on a user interface of one of the experts of the selected question and a request to answer the question.

In one example, selecting the question further includes prioritizing questions for selection that have not been asked yet in the group.

In one example, the method 1000 further comprises detecting that the first user has requested to post the selected question, and posting the question in a feed of the selected group.

In one example, selecting the group further comprises determining the group with a highest group-to-skill score for the user skill inserted into the template.

In one example, the method 1000 further comprises detecting a user action that triggers the generation of the prompt.

In view of the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: determining, for one or more groups of a user network, at least one group skill associated with each respective group of the one or more groups: generating a prompt based on one or more user skills of a first user registered in the user network, the generating the prompt comprising inserting at least one of the one or more user skills into a prompt template to generate the prompt, the prompt template including a request to generate one or more questions for the respective group: providing the prompt as input into a generative artificial intelligence (GAI) model: selecting a question from an output of the GAI model using the prompt as the input: selecting a group for the selected question based on the at least one user skill inserted into the prompt template and the at least one group skill associated with the groups; and causing presentation of the selected question and the selected group on a user interface of a client device associated with the first user.

In yet another general aspect, a non-transitory machine-readable storage medium (e.g., a non-transitory storage medium) includes instructions that, when executed by a machine, cause the machine to perform operations comprising: determining, for one or more groups of a user network, at least one group skill associated with each respective group of the one or more groups; generating a prompt based on one or more user skills of a first user registered in the user network, the generating the prompt comprising inserting at least one of the one or more user skills into a prompt template to generate the prompt, the prompt template including a request to generate one or more questions for the respective group: providing the prompt as input into a generative artificial intelligence (GAI) model: selecting a question from an output of the GAI model using the prompt as the input: selecting a group for the selected question based on the at least one user skill inserted into the prompt template and the at least one group skill associated with the groups; and causing presentation of the selected question and the selected group on a user interface of a client device associated with the first user.

Figure 11:
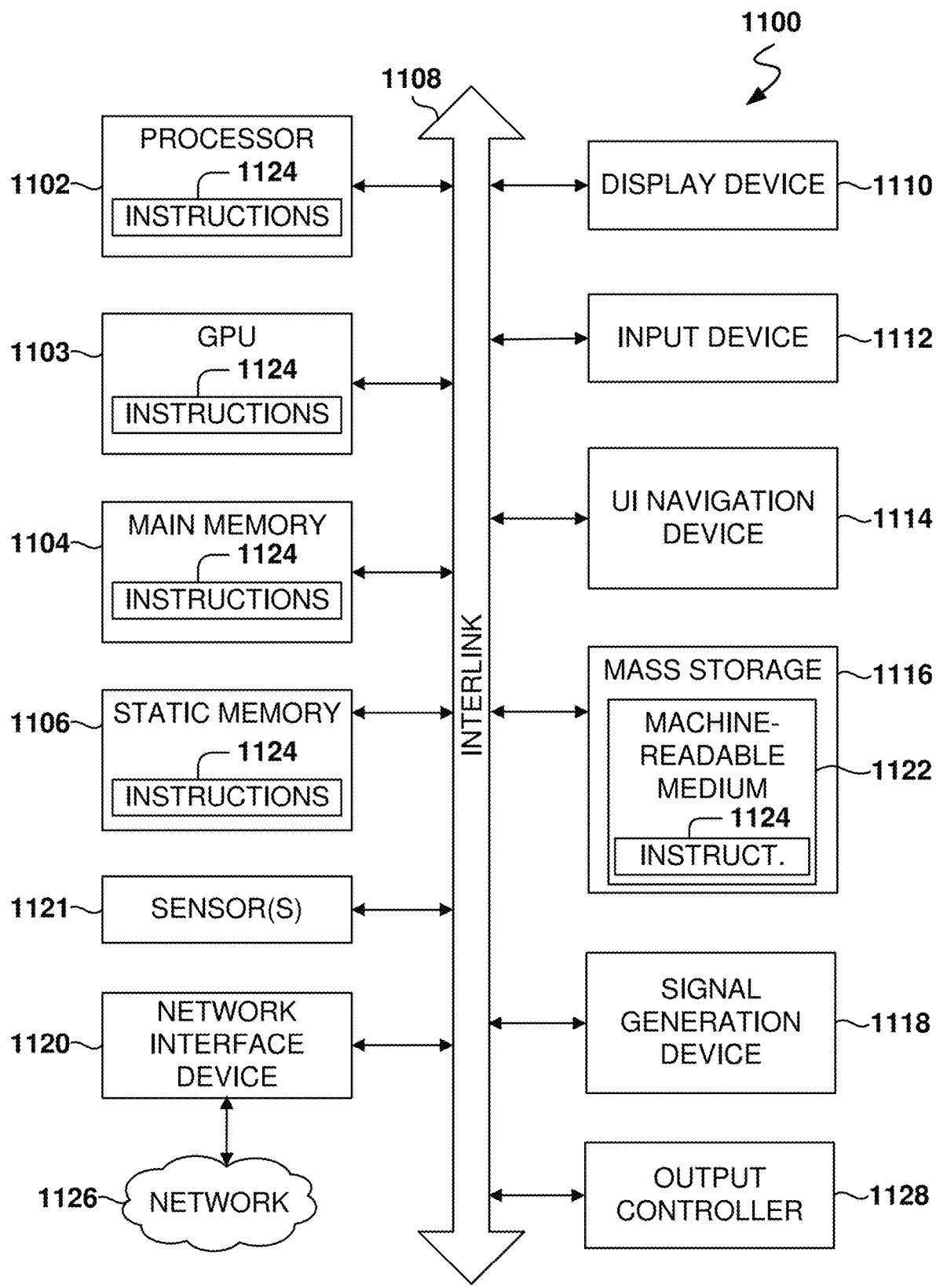
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 1100 (e.g., computer system) may include a hardware processor 1102 (e.g., a central processing unit (CPU), a hardware processor core, or any combination thereof), a graphics processing unit (GPU 1103), a main memory 1104, and a static memory 1106, some or all of which may communicate with each other via an interlink 1108 (e.g., bus). The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device 1116 (e.g., drive unit), a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is provisionally claimed is:

1. A computer-implemented method comprising:
determining, for one or more groups of a user network, at least one group skill associated with each respective group of the one or more groups, the at least one group skill determined by a group to skill mapper trained to categorize topics in existing posts of a respective group into topic clusters and to map the topic clusters to skills;
generating a prompt based on one or more user skills of a first user registered in the user network, the generating the prompt comprising inserting at least one of the one or more user skills into a prompt template to generate the prompt, the prompt template including a request to generate one or more questions for the respective group;
providing the prompt as input into a generative artificial intelligence (GAI) model;
selecting a question from an output of the GAI model using the prompt as the input;
selecting a group for the selected question based on the at least one user skill of the first user inserted into the prompt template and the at least one group skill associated with the groups determined via the group to skill mapper;
causing presentation of the selected question, the selected group, and a corresponding selectable button on a user interface of a client device associated with the first user; and
upon receiving a selection of the corresponding selectable button, posting, as the first user, the selected question to the selected group.

2. The method as recited in claim 1, wherein determining the at least one group skill associated with each group comprises:
identifying topics for the group based on posts in the group;
determining first skills associated with the identified topics;
identifying second skills associated with members of the group; and
determining the at least one skill of the group based on the first skills and the second skills.

3. The method as recited in claim 1, wherein determining a user intent of the first user is based on activity of the first user in the user network, the user intent being as least one of job seeker, career accelerator, or expertise growth.

4. The method as recited in claim 3, wherein generating the prompt further includes:
inserting text in the prompt about the determined user intent of the first user.

5. The method as recited in claim 1, wherein generating the prompt further includes:
inserting text in the prompt about an industry, registered in the user network, of the first user.

6. The method as recited in claim 1, further comprising:
detecting that the first user has posted the selected question in the selected group; and
identifying one or more experts for answering the selected question based on one or more skills of the one or more experts.

7. The method as recited in claim 6, further comprising:
causing presentation on a user interface of one of the experts of the selected question and a request to answer the question.

8. The method as recited in claim 1, wherein selecting the question further includes:
prioritizing questions for selection that have not been asked yet in the group.

9. The method as recited in claim 1, further comprising:
detecting that the first user has requested to post the selected question; and
posting the question in a feed of the selected group.

10. The method as recited in claim 1, wherein selecting the group further comprises:
determining the group with a highest group-to-skill score for the user skill inserted into the template.

11. The method as recited in claim 1, further comprising:
detecting a user action that triggers the generation of the prompt.

12. A system comprising:
a memory comprising instructions; and
one or more computer processors, wherein the instructions, when executed by the one or more computer processors, cause the system to perform operations comprising:
determining, for one or more groups of a user network, at least one group skill associated with each respective group of the one or more groups, the at least one group skill determined by a group to skill mapper trained to categorize topics in existing posts of a respective group into topic clusters and to map the topic clusters to skills;
generating a prompt based on one or more user skills of a first user registered in the user network, the generating the prompt comprising inserting at least one of the one or more user skills into a prompt template to generate the prompt, the prompt template including a request to generate one or more questions for the respective group;
providing the prompt as input into a generative artificial intelligence (GAI) model;
selecting a question from an output of the GAI model using the prompt as the input;
selecting a group for the selected question based on the at least one user skill of the first user inserted into the prompt template and the at least one group skill associated with the groups determined via the group to skill mapper;
causing presentation of the selected question, the selected group, and a corresponding selectable button on a user interface of a client device associated with the first user; and
upon receiving a selection of the corresponding selectable button, posting, as the first user, the selected question to the selected group.

13. The system as recited in claim 12, wherein determining the at least one group skill associated with each group comprises:
identifying topics for the group based on posts in the group;
determining first skills associated with the identified topics;
identifying second skills associated with members of the group; and
determining the at least one skill of the group based on the first skills and the second skills.

14. The system as recited in claim 12, wherein determining a user intent of the first user is based on activity of the first user in the user network, the user intent being as least one of job seeker, career accelerator, or expertise growth.

15. The system as recited in claim 14, wherein generating the prompt further includes:
    inserting text in the prompt about the determined user intent of the first user.

16. The system as recited in claim 12, wherein generating the prompt further includes:
    inserting text in the prompt about an industry, registered in the user network, of the first user.

17. A non-transitory machine-readable storage medium including instructions that, when executed by a machine, cause the machine to perform operations comprising:
    determining, for one or more groups of a user network, at least one group skill associated with each respective group of the one or more groups, the at least one group skill determined by a group to skill mapper trained to categorize topics in existing posts of a respective group into topic clusters and to map the topic clusters to skills;
    generating a prompt based on one or more user skills of a first user registered in the user network, the generating the prompt comprising inserting at least one of the one or more user skills into a prompt template to generate the prompt, the prompt template including a request to generate one or more questions for the respective group;
    providing the prompt as input into a generative artificial intelligence (GAI) model;
    selecting a question from an output of the GAI model using the prompt as the input;
    selecting a group for the selected question based on the at least one user skill of the first user inserted into the prompt template and the at least one group skill associated with the groups determined via the group to skill mapper;
    causing presentation of the selected question, the selected group, and a corresponding selectable button on a user interface of a client device associated with the first user; and
    upon receiving a selection of the corresponding selectable button, posting, as the first user, the selected question to the selected group.

18. The non-transitory machine-readable storage medium as recited in claim 17, wherein determining the at least one group skill associated with each group comprises:
    identifying topics for the group based on posts in the group;
    determining first skills associated with the identified topics;
    identifying second skills associated with members of the group; and
    determining the at least one skill of the group based on the first skills and the second skills.

19. The non-transitory machine-readable storage medium as recited in claim 17, wherein determining a user intent of the first user is based on activity of the first user in the user network, the user intent being as least one of job seeker, career accelerator, or expertise growth.

20. The non-transitory machine-readable storage medium as recited in claim 19, wherein generating the prompt further includes:
    inserting text in the prompt about the determined user intent of the first user.

\* \* \* \* \*